Figure 1:
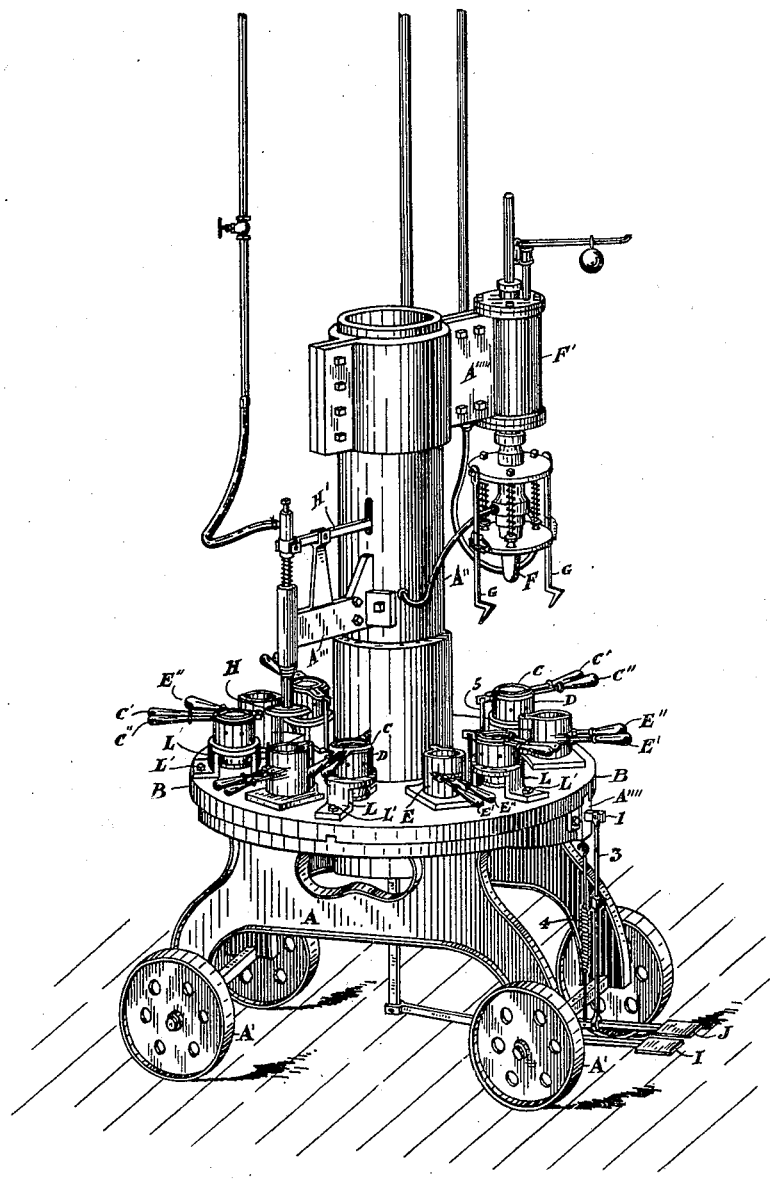

No. 644,395. Patented Feb. 27, 1900.
E. B. BALL.
GLASS BLOWING AND PRESSING MACHINE.
(Application filed Oct. 31, 1898.)

(No Model.) 3 Sheets—Sheet 1.

WITNESSES:
Thos. L. Ryan
H. H. Wolf

INVENTOR,
Edmund B. Ball
by Wm. Du Val Brown
his ATTORNEY.

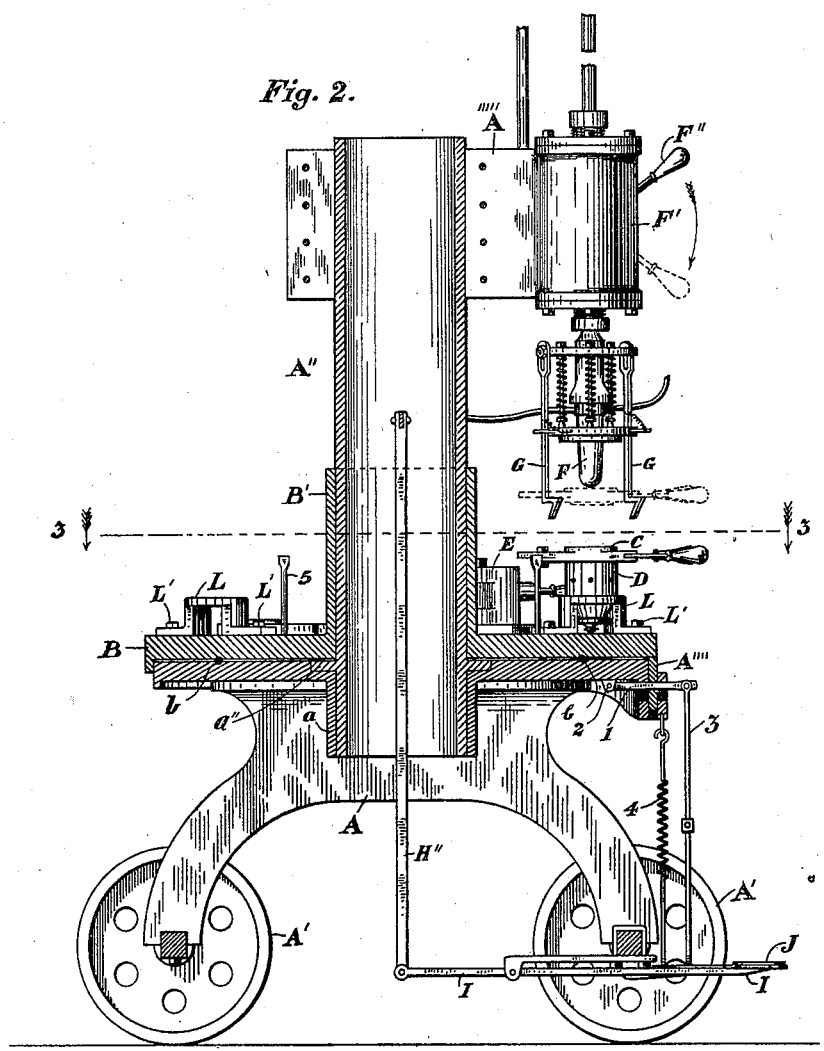

No. 644,395. Patented Feb. 27, 1900.
E. B. BALL.
GLASS BLOWING AND PRESSING MACHINE.
(Application filed Oct. 31, 1898.)
(No Model.) 3 Sheets—Sheet 3.
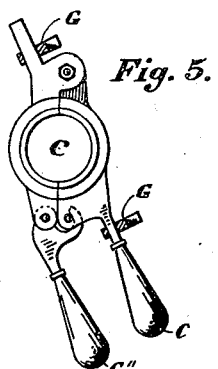
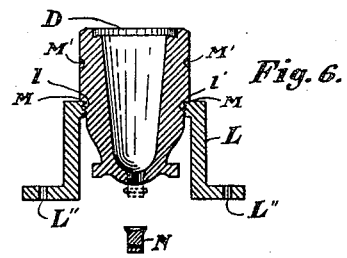
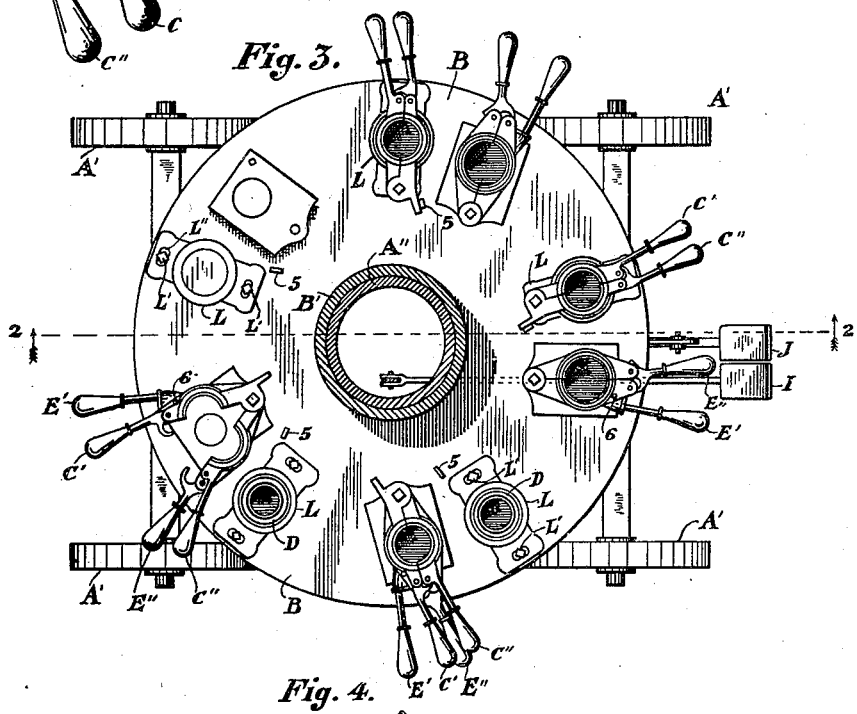
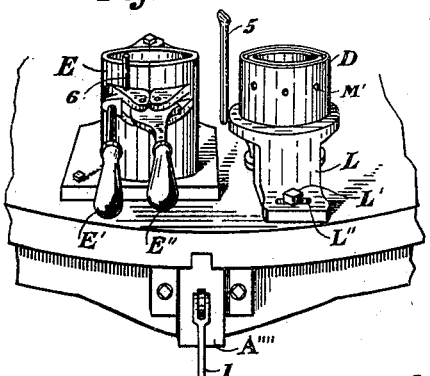
WITNESSES:
Thos. L. Ryan
N. H. Wolf
INVENTOR,
Edmund B. Ball
by Wm DuVal Brown
his ATTORNEY.
THE NORRIS PETERS CO., PHOTO-LITHO., WASHINGTON, D. C.

UNITED STATES PATENT OFFICE.

EDMUND B. BALL, OF MUNCIE, INDIANA, ASSIGNOR TO THE BALL BROTHERS GLASS MANUFACTURING COMPANY, OF SAME PLACE.

GLASS BLOWING AND PRESSING MACHINE.

SPECIFICATION forming part of Letters Patent No. 644,395, dated February 27, 1900.

Application filed October 31, 1898. Serial No. 695,062. (No model.)

*To all whom it may concern:*

Be it known that I, EDMUND B. BALL, a citizen of the United States, residing at Muncie, county of Delaware, and State of Indiana, have invented new and useful Improvements in Glass Blowing and Pressing Machines, of which the following is a specification.

My invention relates to certain improvements in glass-blowing machines, and more specifically to such a machine as is shown and described in Letters Patent of the United States No. 608,022, issued to Alvah L. Bingham, dated July 26, 1898, and No. 610,515, issued to Frank C. Ball, dated September 6, 1898. I have illustrated a complete machine embodying my present improvements in order that they, in connection with the other parts of the machine, may be clearly understood and will for the purpose of clearness briefly describe such a machine, but the detail description will principally relate to the parts involved in my present improvements.

My improved machine is illustrated in the accompanying drawings, wherein like letters and numerals of reference indicate corresponding parts in the several views, and in which—

Figure 1 is a perspective view of my improved glass-blowing machine. Fig. 2 is a vertical section on the line 2 2, Fig. 3, showing the blowing-head-actuating mechanism in elevation. Fig. 3 is a horizontal section through the standard of the machine and above the table and pressing and blowing molds as seen from the line 3 3, Fig. 2, showing said molds in plan and the neck-molds in different positions on the blowing and pressing molds. Fig. 4 is a detail perspective view of the pressing-mold and blowing-mold and the adjusting-stops for the neck-mold, the latter not shown. Fig. 5 is a detail plan view of the neck-mold, and Fig. 6 is a vertical central longitudinal section through the pressing-mold.

In the drawings the portions marked A represent the frame of the machine, suitable to contain and support the various parts of the machine.

B designates a rotating table supported on the frame, and $b$ a series of balls interposed between the frame and table in order that the table can be readily rotated. The frame is supported by the wheels A'. Extending up centrally from the table B is a hollow standard A''. This standard extends below the frame and is supported thereby by means of the collar $a''$, seated in the frame, and by the sleeve extension $a$, extending down from the frame. The standard is further held in position by means of the sleeve B', extending upward from the table.

C designates the neck-molds, D the pressing-molds, and E the blowing-molds. The pressing-molds and the blowing-molds are supported on the rotatable table B. The table is adapted to be revolved during the progress of the work and to be accurately stopped from time to time at the proper positions.

The pressing-molds and blowing-molds are arranged in sets, and I have shown five such sets in the drawings. There are as many notches in the edge of the table as there are sets of molds. Mounted in the bed-plate of the frame A adjacent to the edge of the table is a latch or detent A'''', which is operated by means of the treadle J. In detail the construction of the detent-controlling mechanism shown consists of a lever 1, which is pivoted at 2 to the under side of the frame A and passes out through a slot in the housing and through the latch A'''' (which is perforated to receive it) to the outside of the machine. Here it is connected to a rod 3, which runs down to the treadle J. The latch is held into engagement by a spring-support 4, connected at one end to the treadle-arm and at the other end to the frame of the machine. When the treadle is depressed, the latch is drawn out of the notch in which it is at the time, and the table is free to be revolved. The treadle may be immediately released, as the latch or detent A'''' will run easily along the under side of the table-rim until the next notch therein is reached, into which when reached it will promptly enter, being impelled by the spring 4.

Supported on the standard A'' are the brackets A''''' and A''', which carry the plunger and blowing-head, respectively. The blowing-head and plunger have been fully described and shown in Patent No. 608,022, and it is not deemed necessary to more fully describe them in the present application, as they form no part of the present invention.

The construction of the neck-molds and blowing-molds have been fully described in the patent granted to Ball, No. 610,515, hereunto referred to, as has been the general construction of the machine and the working of the various parts, and as these parts form no part of the present invention a detail description will be omitted.

For the purpose of clearness it will be stated that F designates the plunger-head, and G the spring-hooks for lifting the neck-mold from the pressing-mold, and F' the cylinder for operating the plunger, which is controlled by the lever F''.

H designates the blowing-head, operated by the levers H' H'' and treadle I.

The blowing-mold is formed in two parts and opened and closed by the handles E' E''. The neck-molds are also formed in two parts, operated by the handles C' and C'', the construction being identical with the construction shown in Patent No. 610,515.

5 designates a stop for adjusting the neck-mold on the pressing-mold, and 6 a pin for adjusting the said mold on the blowing-mold.

In the patent to Ball, No. 610,515, the pressing-mold D is supported directly upon the rotatable table B, and I have in the actual operation of this machine found that the said mold so supported will become too cool and will not make a perfect jar. The mold resting directly on the table and the plunger inserted in the hot glass will heat the mold; but a certain amount of the heat will be transferred to the table, and the table being a large piece of iron will quickly absorb and carry away the heat from the mold. To remedy this defect, I have supported the pressing-mold upon a standard L, which rests on the table and is secured thereon by means of the bolts L', which pass through an elongated slot L'' in the base of the standard. The standard is provided with an interior screw-threaded portion l, which engages a screw-thread l' on the exterior of the mold, as plainly shown in Fig. 6. The mold is provided with an annular shoulder M, which rests on the top of the standard L. Above the shoulder is a series of apertures M', in which a spanner-wrench can be inserted to readily place and screw in position the mold on the standard. By this construction the pressing-mold is supported above the table, so that no heat can be transposed from the mold to the table, thereby keeping the mold at all times sufficiently hot, and at the same time I can adjust the mold at the required distance from the table and can readily withdraw the mold entirely from the standard in case the mold is injured or for any other reason. I have also found in the construction of the pressing-mold shown in the Patent No. 610,515 that the plunger carrying the neck-mold and the glass secured thereto could not be easily and readily withdrawn from the mold, owing to the fact that a vacuum would be formed in the bottom of the mold. I have therefore conceived the idea of providing the molds with a gravity-valve N, located at the bottom of the mold, as plainly shown in Fig. 6. When the plunger carrying the glass in the mold rises, the hot glass will stick to the upper end of the valve, raising the same a sufficient distance to admit air to the bottom portion of the mold, thereby breaking the vacuum and assisting the plunger to be withdrawn therefrom.

I am aware that many minor changes can be made in the construction and arrangement of parts without in the least departing from the nature and principles of my invention.

Having thus described my invention, what I claim as new, and desire to secure by Letters Patent, is—

1. In a glass-blowing machine, the combination with a table, of a blowing-mold on the table, and a pressing-mold supported by the table, positioned out of contact therewith and secured in place at adjustable distances therefrom.

2. In a glass-blowing machine, the combination with a table, of a blowing-mold on the table, and a removable pressing-mold supported by the table, positioned out of contact therewith and secured in place at adjustable distances therefrom and located adjacent to the blowing-mold.

3. In a glass-blowing machine, the combination with a table, of a standard on the table, a screw-threaded portion on the standard, a pressing-mold having a screw-thread on its exterior, the screw-thread on the exterior of the mold adapted to engage the screw-threaded portion of the standard whereby the mold can be secured to and supported by the standard.

4. In a glass-blowing machine of the character described the combination with a rotary table carrying the blowing-mold, of a substantially U-shaped support on the table extending beyond the same, and a pressing-mold seated in the support beyond and out of contact with the table, substantially as described.

5. In a glass-blowing machine, of the character described, the combination with a metallic table and blowing instrumentalities, of a pressing-mold into which a heated body of glass is primarily inserted, a standard extending from the table and having a seat to which the mold is secured out of contact with the table thereby preventing the rapid passage of the heat from the mold to the table, means for shaping the glass in the mold, a blowing-mold and means for transferring the article from the pressing-mold to the blowing-mold, substantially as described.

In testimony whereof I have hereunto set my hand in the presence of two witnesses.

EDMUND B. BALL.

Witnesses:
M. L. HAGEMAN,
J. WALTER BROWN.